Patented Nov. 5, 1940

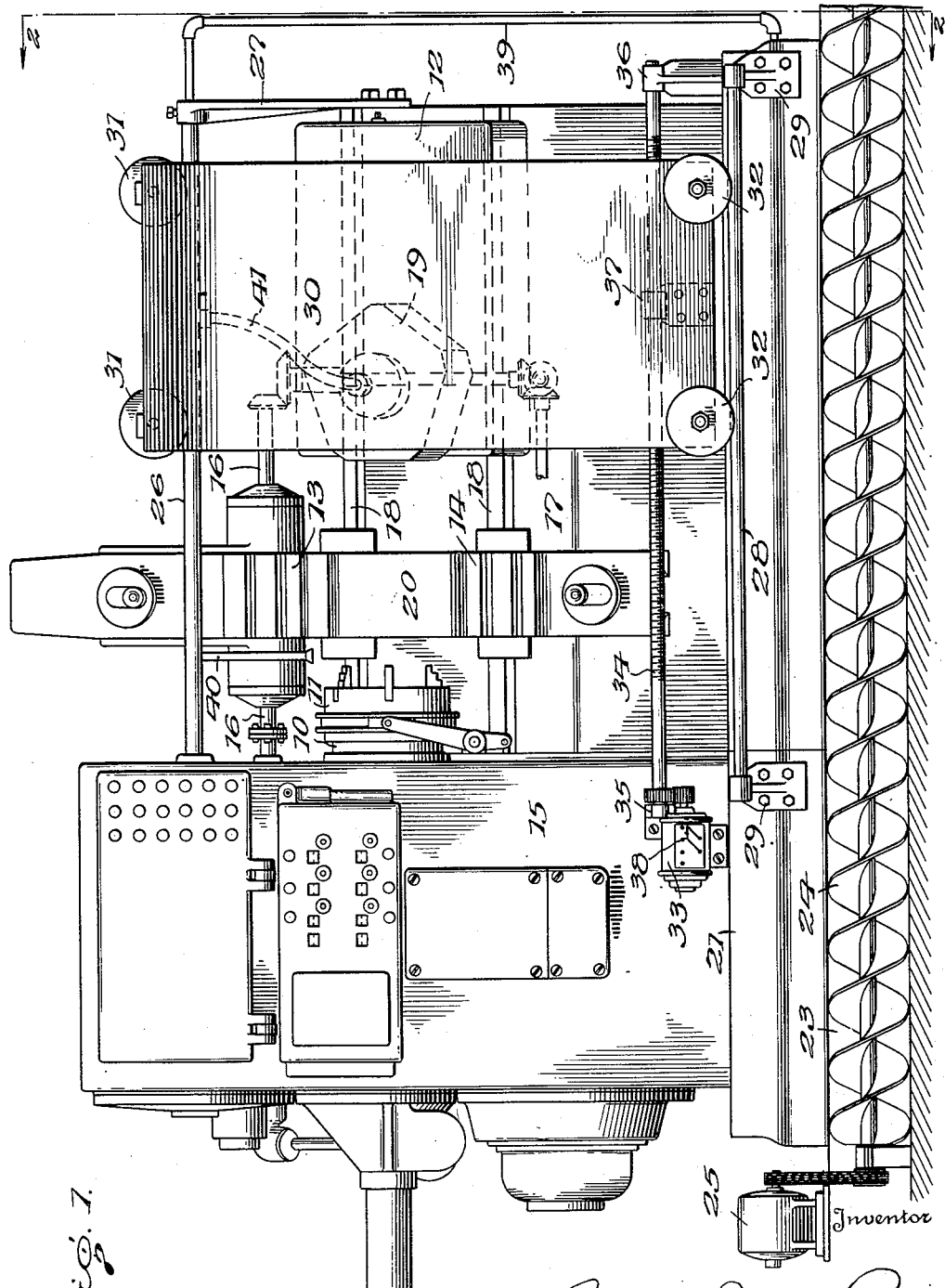

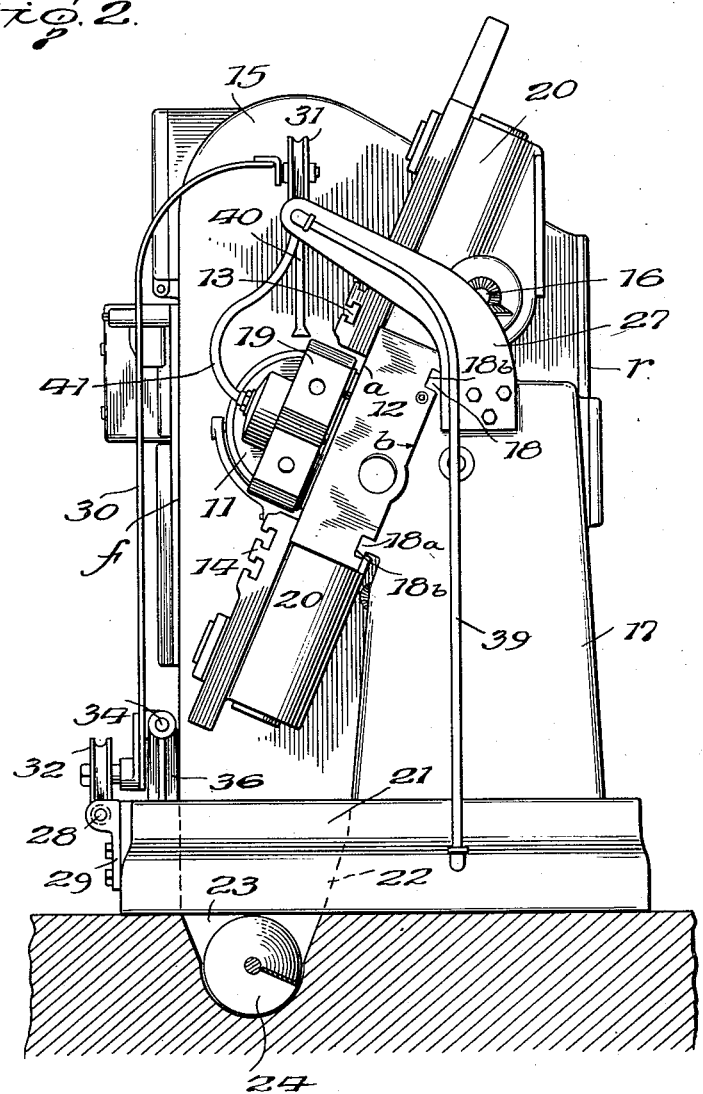

2,220,425

UNITED STATES PATENT OFFICE 2,220,425

MACHINE TOOL

William Wallace Potter, Narragansett, R. I.

Application August 24, 1938, Serial No. 226,561

8 Claims. (Cl. 29—44)

The present invention relates to improvements in machine tools and more particularly to that type machine tool which employs a slide movable to and fro relative to a spindle or other equivalent operating part.

In machine tools of the above stated type the slide carries a holder for supporting either a tool or the work to be operated upon; and this holder may or may not be of the type, which permits rotation of the tool or work, or of the turret type.

At any rate in all previous, so called, horizontal machine tools of which the applicant has knowledge, the slide is disposed in a horizontal plane and carries the holders on the top surface thereof, the slides being mounted on one or more guides which are disposed in a horizontal plane. Thus, the slides and other guide ways, as well as the holders carried by them, often project beyond the sides of the machine obstructing aisle ways and requiring more floor space for the machine as well as having numerous other attendant disadvantages.

The object of the present invention is to provide a machine tool of the above stated character wherein all slides thereof, whether the main slide or cross slides, are disposed at an angle inclined upwardly from one side of the machine with respect to a horizontal transverse line through the machine, this arrangement eliminating projecting portions of the slides and their supports from extending beyond the sides of the machine; allowing the operator closer access to the work and tool and allowing him to adjust any tool on any slide, turret or on any face thereof, from a position while standing in front of the machine; allowing compound and chips to flow directly into a pan instead of remaining on the slide or slide guide-ways; and further allowing for an easy way of shielding or guarding the machine.

A further object of the invention is the provision of novel means for guarding the front of the machine when the parts are in operation.

Another object of the invention is the operation of novel means for collecting and discharging chips, compound, and like matter from the machine or a series of such machines.

With the above and other objects in view the invention resides in the sundry details of construction, combination, and arrangement of parts hereinafter more fully described and pointed out in the appended claims.

In the drawings, which show a preferred embodiment of the invention as at present devised:

Fig. 1 is a front view of the machine tool and for purposes of illustration is shown as of the lathe type and equipped with the present invention; and Fig. 2 is an end view of the machine equipped with the present invention and looking from the right hand end of the machine as shown in Fig. 1.

Throughout the specification and drawings, like characters of reference denote like corresponding parts.

The machine tool shown in the drawings may be of any type having a base pan 21, at one end of which is disposed a horizontal rotatable spindle 10 carrying a chuck 11 on its inner end, or it may carry a center as when the machine tool is a center turning lathe. On the other portion of the base 21 are mounted for to and fro movement slide 12 and cross slides 13 and 14. The spindle is supported in bearings in a housing 15 which may contain the driving mechanism and the slides 12, 13, and 14 may be driven from a feed shaft 16, in the manner shown in copending application Serial No. 212,565, or by any other suitable means.

The slides 12, 13, and 14 are mounted on a support 17 positioned on the base 21 to the rear of the front face of the machine (as shown in Fig. 1) and may be in the form of a housing in which there is disposed mechanism for operating the slide 12 and driven from the feed shaft 16. This support 17, as can be pictorially seen from Fig. 2, is preferably to one side of the axis of the spindle and at the rear of the machine.

The support 17 has disposed thereon substantially parallel spaced guides 18 which extend horizontally of the machine but which lie in a plane inclined to the vertical,—that is, inclined upwardly and rearwardly from the front face or side of the machine and at an acute angle with respect to the base 21. These guides 18 may be formed integral with the support 17, as shown, and provide between them a guide-way or bearing surface 18ᵃ for the slide 12.

The slide 12, preferably, consists of a plate or casting having a top and bottom surface $a$ and $b$, respectively. The top surface $a$ carries either tool or work holders 19, while the bottom surface $b$ is provided with ways 18ᵇ complemental to the guides 18 and surface 18ᵃ. In the illustration of the drawings, the holder 19 is shown as an indexable turret whose faces may be brought into cooperative relation with the spindle 10, in a manner well understood in the art. Of course, it is to be understood that any type of a holder that is desirable or conventional may be carried on the slide 12 in the usual manner.

The cross slides 13 and 14, which are also designed for cooperation with the spindle in a manner well understood in the art, are mounted for transverse slidable movement on a cross slide base 20, which is preferably supported by the support 17; this base 20 may be integral with the support 17, or if a separate element, is rigidly attached thereto in any approved manner, but the base 20 is inclined upwardly and rearwardly of the machine from the front side of the latter. It is preferred to mount the base 20 of the cross slides on the guides 18 in order that the position of the base 20 with respect to the spindle 10 may be adjusted along the length of the guides 18, the cross slides, of course, as shown in Fig. 2, being out of the plane of movement of the slide 12. Thus, the angularity at which the guides 18 are disposed with respect to the horizontal is such that the slides 12, 13, and 14, and the tools or tool holders carried thereby will lie within the confines of the front and rear sides f and r, respectively, of the machines (see Fig. 2). Consequently, the machine will occupy less floor space and will have no parts projecting into the aisle between a series or rows of machines; the operator, who stands in front of the machine has closer access to the parts and can adjust any tool or any slide while standing in front of the machine without the necessity of going to the other or rear side of the machine: and this arrangement allows the chips and cutting compound or oil to fall directly in the pan 21 of the machine without lodging on any of the operating parts, which is commonly experienced in machines where the slides are disposed in a horizontal plane.

The pan 21 has a longitudinal opening 22 therein under the slides and spindle and communicates with a trough or conduit 23 underlying the machine. In the conduit 23 is disposed a screw conveyor 24 which will convey chips and other material lodging within the conduit 23 to a suitable point of discharge, the screw conveyor 24 being actuated by a suitable motor 25 or from another convenient source of power. Where several machines are arranged in a row, the conduit 23 may be extended to underlie each of the machines and thereby serve any number or a battery of machines, discharging the waste therefrom at one convenient point, thus eliminating the necessity of cleaning each machine of its chips which accumulate in the pan thereof.

By disposing the main slide 12 and the cross slides 13 and 14 at an acute angle to the horizontal or base 21 of the machine and thus keeping all parts from protruding over the base pan 21 (see Fig. 2), I provide an improved and very convenient construction and one permitting the ready attachment and operation of an improved splash or chip guard. To this end a track bar 26, preferably tubular, extends horizontally from an upper portion of the spindle housing 15 and extends across the front of the machine to the tail stock end thereof where it is supported by a bracket arm 27 suitably secured to the machine, such as to the end wall of the support 17. It is preferred that the track 26 be positioned well above the chuck 11.

A second track 28 is supported in suitable brackets 29 secured on the front face of the base pan. This track 28 is preferably parallel with the track 26.

A chip guard 30 is disposed in front of the machine and extends vertically from the base pan 21 thereof upwardly and over the chuck and the slides for the purpose of protecting an operator while the machine is in operation, for preventing chips from flying out of the machine, and for preventing oil or cutting compound from being splashed out of the machine. This guard 30 is supported on the track 26 by grooved rollers 31 and on the track 28 by grooved rollers 32, the rollers being suitably journalled on the upper and lower portions respectively of the chip guard, and is thus slidable longitudinally of said tracks 26 and 28. The chip guard 30 is of stiff sheet material, preferably a single piece of sheet steel, extending vertically, upwardly, from the lower track 28 and having its upper end portion curved inwardly or rearwardly of the machine to the upper track 26, the upper track 26 being disposed intermediate the front and rear sides of the machine in order to substantially overlie the chuck 11 and the slides 12, 13, and 14, particularly when cooperating in work performing position. It will be understood, of course, that the guard 30 may be of any desired width or heighth and that the track 26 may take any position on the machine which will accomplish this purpose.

The width of the chip guard 30 is so proportioned with respect to the machine that, when in one position it covers the chuck and slides when the latter are in work performing position, and when in another position on the tracks will uncover these parts to permit free access thereto as well as to the chuck. This movement of the guard may be accomplished manually or by power means. As a suitable example of operating the chip guard to covering and uncovering positions, a motor 33, which may be suitably supported on the housing 15, is operatively connected with a screw feed rod 34 supported in bearings 35 and 36. The rod 34 is co-extensive with the tracks 26 and 28 and preferably disposed at the lower portion of the machine. An adjacent portion of the chip guard 30 has a lug 37 thereon provided with suitable following means which engage the threads of said feed rod 34 so that rotation of the feed rod in one direction moves the guard towards the chuck or head stock end of the machine, while rotation in another direction moves the guard toward the tail stock end of the machine.

The motor 33 is of the reversible type and is controlled by the double throw switch 38 for effecting reverse rotation of the screw rod 34.

The hollow track 26 also serves as a conductor for the liquid cutting compound or oil necessary to be supplied to the work and tool, when in cooperative work-performing relation. To this end a pipe 39 delivers the cutting lubricant to one end of the hollow track 26 from which it is distributed to various parts of the machine, for example, to the chuck 11 by means of the outlet pipe 40 or to the holders or turret 19 by means of a flexible pipe 41.

It will thus be seen that the present invention provides a very unique and novel arrangement, permitting the operator to stand in front of the machine and have access to all parts of the work and the tool slides from his station in front of the machine and without assuming cramped or bent positions; that the operation of all slides with respect to the work can be viewed from the operator's station in front of the machine; that due to the positioning of the parts as described, the chips have a tendency not to lodge and bank-up upon the slides or slide-ways, but fall into the base of the machine where novel means of collection and discharge is provided; that there are no parts of the machine projecting beyond the front and rear sides of the machine, thus reducing hazard and conserving space; and that a guard is provided which lies within the confines of the machine, yet covers the slides and spindle chuck to prevent injury to attendants, to prevent splash from the machine or oil or liquids used in the cutting operations of the machine and to prevent chips from flying from the machine.

Having thus described the preferred form of the invention and the manner in which it is performed, it is to be understood that the invention is not limited to the exact details of construction shown and described, and is susceptible to various structures and modifications within the scope of the appended claims.

That which is claimed is:

1. In a machine tool, a combination of a supporting frame, a rotatable spindle mounted in the frame on a substantially horizontal axis, a slide for cooperation with the spindle and having substantially horizontal movement toward and away from the spindle, a bed on the frame for the slide and having slide-ways therein, said bed and its slide-ways being positioned in a plane inclined to the vertical with the direction of said ways extending in a substantially horizontal line relative to the axis of the spindle, the angle of inclination of the bed, ways and slide being transverse to the direction of the ways, and a turret rotatably mounted on the slide about an axis substantially perpendicular to the plane of the slide.

2. In a machine tool as set forth in claim 1 further characterized by cross slide guides mounted on the frame and extending transversely of the spindle in an inclined plane substantially corresponding to the inclination of the bed and guide-ways, and cross slides mounted for movement on said cross slide guides.

3. In a machine tool as set forth in claim 1, further characterized by a guard member mounted on the machine and disposed on the side of the machine at which the slide and bed are exposed and accessible and having a horizontal movement to cover and uncover the slide and spindle when the latter are in cooperative relation, and means for moving the guard to shielding and unshielding positions.

4. In a machine tool as set forth in claim 1, further characterized by a guard member mounted on the machine and disposed on the side of the machine at which the slide and bed are exposed and accessible and having a horizontal movement to cover and uncover the slide and spindle when the latter are in cooperative relation, means for moving the guard to shielding and unshielding positions, said shield extending over and rearwardly of said spindle and slide.

5. In a machine tool, as set forth in claim 1 having a guard for shielding the exposed portions of the slide and spindle and movable to shielding and unshielding positions, power means for moving the guard, and means for controlling the direction of movement of the guard.

6. In a machine tool, the combination of a spindle and a slide mounted for cooperative functions, a guard movably mounted on the machine for shielding the exposed portions of the slide and spindle and movable to shielding and unshielding positions, a reversible motor for moving the guard to shielding and unshielding positions, and control means for controlling the operations of said reversible motor.

7. In a machine tool, the combination of a spindle and a slide mounted for cooperative functions, a guard movably mounted on the machine for shielding the exposed portions of the slide and spindle and movable to shielding and unshielding positions, power means for moving the guard to shielding and unshielding positions, and means for controlling the direction of movement of the guard.

8. In a machine tool, the combination of a frame, cooperating machine elements having interrelated movement for performing work, means for supplying a cutting fluid to the work during the operation of said elements, a hollow tubular member for delivering said cutting fluid from said supply means to the work, said tubular member extending longitudinally of the machine and arranged above said cooperating machine elements, a guard supported on said hollow tubular delivering member and extending downwardly over the front of the machine to shield said machine elements, said guard being movable along said tubular member to positions which shield or expose said machine elements, and means for actuating said guard.

WILLIAM WALLACE POTTER.